United States Patent [19]

Roberts

[11] Patent Number: 4,710,820
[45] Date of Patent: Dec. 1, 1987

[54] SINGLE LAYER OPTICAL COUPLER FOR PROJECTION TV CRT

[75] Inventor: William N. Roberts, Niles, Ill.

[73] Assignee: Zenith Electronics Corporation, Glenview, Ill.

[21] Appl. No.: 866,185

[22] Filed: May 22, 1986

[51] Int. Cl.$^4$ ............................................. H04N 5/74
[52] U.S. Cl. ..................................... 358/231; 358/64; 358/237; 358/242; 358/250
[58] Field of Search ............... 358/231, 232, 233, 234, 358/237, 238, 239, 242, 250, 253, 245, 247, 60, 61, 62, 64

[56] References Cited

U.S. PATENT DOCUMENTS

| | | | |
|---|---|---|---|
| 2,517,774 | 8/1950 | Epstein | 358/250 |
| 3,800,085 | 3/1974 | Ambats | 358/250 |
| 4,027,328 | 5/1977 | Lessman . | |
| 4,150,320 | 4/1979 | Mitchell | 358/250 |
| 4,151,554 | 4/1979 | Tucker . | |
| 4,245,242 | 1/1981 | Trcka | 358/64 |
| 4,405,949 | 9/1983 | Hockenbrock et al. . | |
| 4,511,927 | 4/1985 | Bauer . | |

Primary Examiner—Tommy P. Chin
Attorney, Agent, or Firm—Cornelius J. O'Connor; Thomas E. Hill

[57] ABSTRACT

A single layer optical coupler pad is disposed between and in intimate contact with the window of a cathode ray tube (CRT) and a multi-lens assembly for transmitting a video image on the CRT's window to the lens assembly for display on the screen of a projection television receiver. The optical coupler pad has a refractive index closely matching those of the CRT window and lenses and high compressibility to allow for tight-fitting lens-CRT mounting without damage to either. The single layer configuration of the optical coupler pad allows it to be produced at low cost, simplifies its installation during projection television receiver CRT/lens assembly and its removal and retrofitting following television receiver repair, and eliminates the possibility of fluid leakage under extreme environmental conditions. The optical coupler is comprised of a unique combination of first and second resins and first and second catalysts to yield a durable, yet pliable, transparent sheet which is dry and easily handled.

5 Claims, 5 Drawing Figures

SINGLE LAYER OPTICAL COUPLER FOR PROJECTION TV CRT

CROSS-REFERENCE TO RELATED APPLICATION

The present invention is related to but in no way dependent upon co-pending U.S. patent application Ser. No. 595,085, entitled CONTRAST ENHANCING OPTICAL COUPLING PAD FOR PROJECTION TV, filed Mar. 30, 1984, in the name of Sae D. Lee, and assigned to the assignee of the present application, the disclosure of which is expressly incorporated herein by reference.

BACKGROUND OF THE INVENTION

This invention relates generally to cathode ray tube (CRT) and lens assemblies and is particularly directed to a transparent pad optically coupling a CRT and lens assembly in a projection television receiver.

Limitations in image brightness and contrast in standard CRTs have restricted their utility in projection television receivers where a video image is projected onto a reflecting screen. The diffuse reflecting nature of the screen and the increase in size of the image result in substantial attenuation of image brightness and contrast frequently making it difficult to view the projected image at normal room light levels. To improve brightness and contrast many projection television receivers include three CRTs, each providing an image of one of the primary colors of red, green and blue, wherein the three CRTs as well as their respective projected images are maintained in mutual registration. Each CRT is aligned with a respective lens combination by means of which its video image in enlarged and focused upon the televison receiver's projection screen.

Initial projection television receivers included an air gap between the CRT window and the lens assembly. The reflection of light rays from the surface of the CRT's window to the surface of the first lens in the lens assembly, however, gives rise to glare in the thus projected video image and severely limits the contrast ratio in the image projected on the viewing screen. Early attempts to improve the brightness and contrast of the video image air-coupled from the CRT window to the lens assembly involved the use of higher CRT power levels which, unfortunately, created a viewer hazard in the form of excess X-radiation levels.

Attempts to improve video image coupling from the CRT to the lens assembly have made use of solid optical systems which typically include the use of colored beamsplitters near the focal plane of a primary mirror of the optical system, such as disclosed in U.S. Pat. No. 4,027,328 to Lessman, and liquid coupling systems which attempt to match the refractive indices of the CRT and lens assembly and also frequently provide cooling for the CRT. Examples of liquid optical coupling arrangements can be found in U.S. Pat. Nos. 4,151,554 to Tucker (crossed dichroic mirrors disposed within a liquid filled chamber for presenting a single image), 4,511,927 to Bauer (a closed chamber disposed between and in contact with the CRT and lens assembly and including a refractive index-matched liquid), and 4,405,949 to Hockenbrock et al (liquid optical coupling arrangement which also affords CRT cooling), which is assigned to the assignee of the present application. While affording improved video image brightness and contrast, prior art approaches have generally suffered from excessive complexity and expense and somewhat low reliability. For example, the solid optical CRT-lens interface system which includes internal beamsplitters requires a precisely shaped optical arrangement with a complicated internal structure, while many of the liquid optical coupling and cooling arrangements are subject to leakage of the liquid refractive material/coolant.

The above cross-referenced patent application contemplates an optical coupling pad disposed between and in intimate contact with the CRT's window and the lens assembly and includes a multi-layer optical coupling pad having two outer, relatively hard layers, a first intermediate layer having relatively high mechanical tensile strength, and a second intermediate layer which is very soft and provides the pad with high compressibility. The four layers of the optical pad are each comprised of a respective silicone resin in different proportions to a given catalyst. While substantially improving optical coupling between the CRT and lens assembly, this multi-layer arrangement requires a somewhat complicated manufacturing procedure which increases the cost of this approach.

The present invention represents an improvement over the prior art and is directed to a single layer optical coupling pad disposed in tight fitting relation between a CRT and lens assembly in a projection television receiver which not only exhibits excellent optical and mechanical coupling characteristics, but also is inexpensively manufactured, easily installed and removed from in between the CRT and lens assembly, and provides greater CRT protection during installation.

OBJECTS OF THE INVENTION

Accordingly, it is an object of the present invention to provide an improved CRT/lens assembly in a projection television receiver.

It is another object of the present invention to provide improved optical and mechanical coupling between a CRT and lens assembly in a projection television receiver.

Yet another object of the present invention is to improve the video image provided by a CRT to a lens assembly in a projection television system.

A further object of the present invention is to provide a low cost, easily installed and retrofitted, durable optical coupling pad for a projection television CRT/lens assembly.

A still further object of the present invention is to eliminate air gaps between a projection television receiver CRT and an associated lens assembly using a single, highly transparent, refractive index-matched optical coupling pad.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
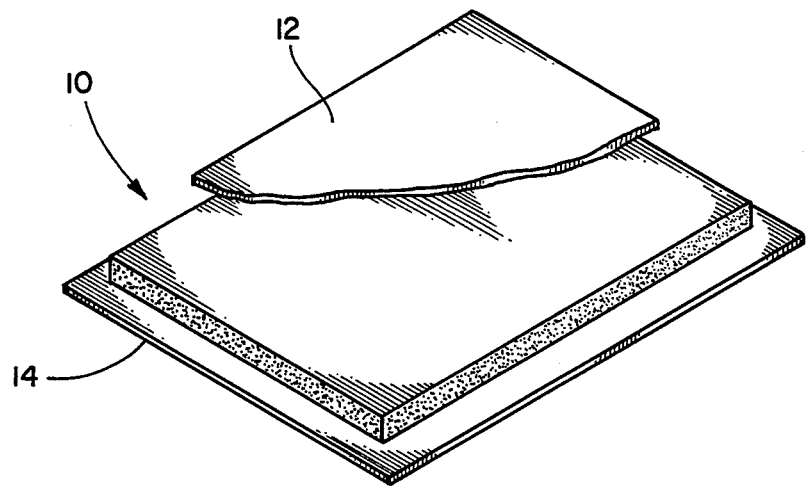
FIG. 1 is a perspective view of an optical coupling pad contructed in accordance with the present invention.

Referring to FIG. 1, there is shown a perspective view of a single layer optical coupler pad 10 constructed in accordance with the present invention. Prior to usage, the single layer optical coupler pad 10 is stored between a pair of protective covers 12, 14, each preferably comprised of polypropylene or Mylar. For the present application, the optical coupler pad 10 is shaped into a generally rectangular configuration for positioning upon and use with a projection television CRT as shown in FIG. 2.

Figure 2:
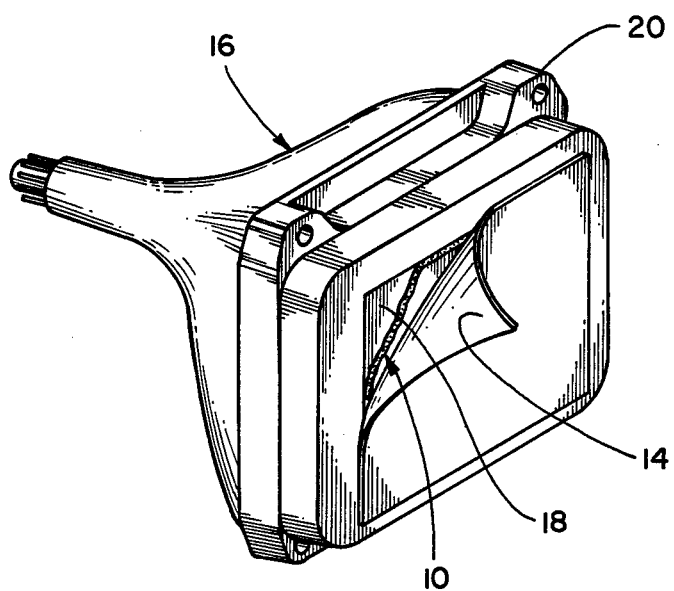
FIG. 2 is a perspective view of a liquid cooled projection CRT with the optical coupling pad of FIG. 1 in position.

As shown in FIG. 2, one of the protective covers is first removed from the optical coupler pad 10 and the pad is then positioned upon so as to cover the outside surface of the faceplate/window 18 of a projection television receiver CRT 16. With the optical coupler pad 10 firmly urged into contact with the CRT's window 18, the adhesive nature of the optical coupler pad allows it to remain in position thereon to permit the second protective cover 14 to be removed from the optical coupler pad. This permits the thus exposed surface of the optical coupler pad 10 to be urged into intimate contact with an end element of a multi-lens optical projector arrangement as shown in FIGS. 3 and 4.

Figure 3:
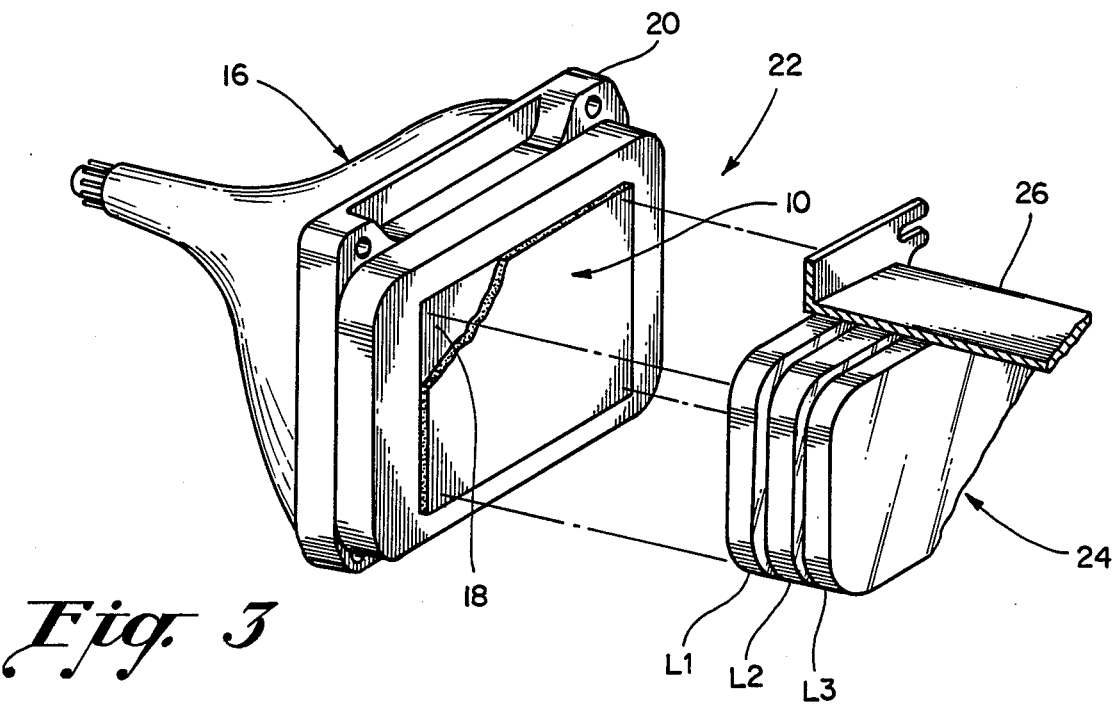
FIG. 3 is an exploded perspective view showing a liquid cooled CRT in combination with a lens assembly for use in a projection television receiver.
Figure 4:
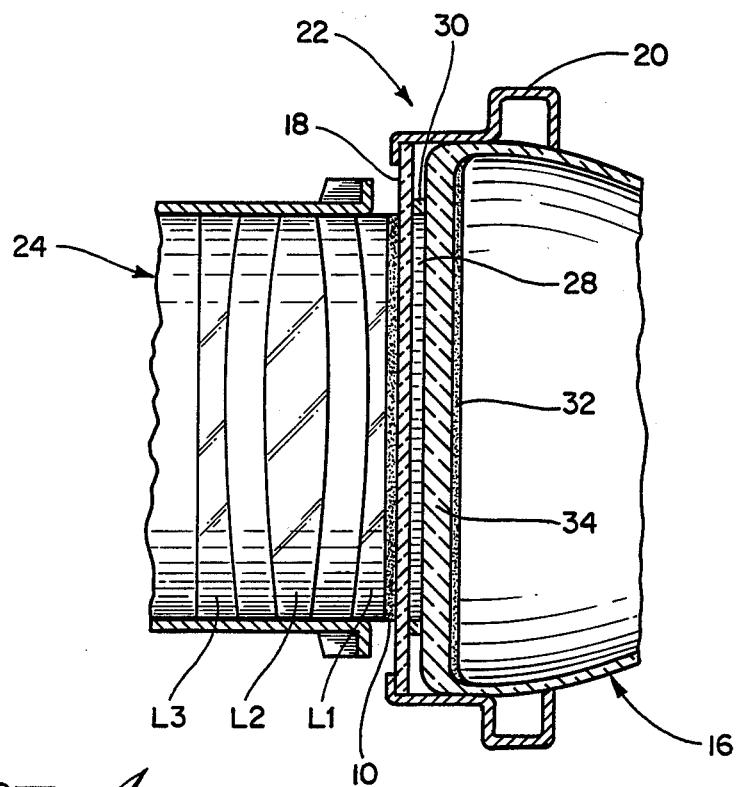
FIG. 4 is a sectional view of the projection CRT of FIG. 3 illustrating the manner in which the CRT is optically coupled to a projection lens assembly by the optical coupling pad of the present invention.

FIGS. 3 and 4 respectively illustrate exploded perspective and lateral sectional views of the combination of a projection television receiver CRT 16 and multilens optical projector 24, between which is positioned in tight fitting relation the optical coupler pad 10 of the present invention. The optical projector 24 includes a plurality of lens elements L1, L2 and L3 which are all mounted to a bracket 26 for securing the optical projector to a mounting/coupling block 20 positioned on a forward portion of the CRT 16. Conventional theaded pins such as screws or bolts may be utilized to couple the bracket 26 to the CRT's mounting/coupling block 20 in a conventional manner.

As best illustrated in FIG. 4, in order to reduce the operating temperature of the CRT's face panel or faceplate 34, a chamber 30 is provided between the CRT's face panel and its window 18. Within the chamber is disposed a liquid coolant 28. An electroluminescent screen 32 is affixed to the inner surface of the CRT's face panel 34 and, when impacted by electromagnetically deflected and accelerated electrons, develops an image which appears on the outer surface of the face panel 34. With the image projection system 22 comprised of the CRT 16 and optical projector 24 arranged in the manner shown in FIG. 4, the image developed on the electroluminescent screen 32 is then transmitted via the liquid coolant 28, the CRT window 18 and the optical coupler pad 10 to the first lens element L1 of the optical projector 24. The geometric centers or axes of the CRT face panel 34, the window 18, the optical coupler pad 10 and lens element L1 are maintained coincident by appropriate mounting and clamping apparatus.

In accordance with the present invention, the single layer optical coupler pad 10 is applied to the CRT 16 by positioning a first layer of the optical coupler pad in intimate contact with the CRT's window 18 after a first protective cover 12 is removed from the optical coupler pad. With the optical coupler pad 10 firmly urged in contact with the CRT's window 18, the second protective cover 14 disposed over a second, facing surface of the optical coupler pad is then removed and the outer surface of a first lens element L1 in the optical projector 24 is then urged into intimate contact with the thus exposed second surface of the optical coupler pad. The image projection system 22 is then securely assembled by coupling the bracket 26 to the CRT's mounting/coupling block 20 by conventional means (not shown). The thus assembled image projection system 22 is characterized by a sandwich construction as shown in FIG. 4.

The single layer optical coupler pad 10 of the present invention is comprised of a combination of resins and catalysts which provide a pad having optimum mechanical and optical characteristics for use in a projection television receiver CRT/lens combination. The composition of the single layer optical coupler pad 10 in a preferred embodiment is given by Table I in terms of the quantity in grams and preferred percentage range of the various constituents. As shown in Table I, the optical coupler pad is produced by mixing Part A with Part B in a ratio of 25:20, pouring the mixture into a mold, and curing in an oven at 100° C. for 15 to 30 minutes.

TABLE I

| Material | Quantity in Grams | Preferred Range % |
|---|---|---|
| PART A | | |
| Sylgard 184 base resin | 10 | 20–40 |
| Sylgard 527-A resin | 15 | 60–80 |
| PART B | | |
| Sylgard 184 catalyst | 0.3 | 1–2 |
| Sylgard 527-B catalyst | 19.7 | 98–99 |

The use of a single layer optical coupling pad in a projection television receiver eliminates CRT breakage encountered in the prior art assembly of the CRT/projection lens combination arising from excessive compressive forces. In addition, the presence of air bubbles between the single layer optical coupler pad 10 of the present invention and the CRT window 18 and the outer surface of the first lens L1 of the optical projector 24 is substantially eliminated. Such air bubbles degrade video image quality by providing a refractive index mismatch in the projection television's video image optical path. In some multi-layer optical coupler pads curing differentials between the various layers give rise to outer surface irregularities resulting in the presence of air bubbles between the optical coupler pad and the CRT and lens assembly. By providing a uniformly cured optical coupler pad possessing facing surfaces of uniform, substantially identical texture and smoothness, air bubbles are essentially elminated from the video image optical path by the single layer optical coupler pad of the present invention. In addition, the uniform composition of the single layer optical coupler pad of the present invention provides a structure which exhibits more uniform and predictable physical properties and characteristics with changes in temperature than the prior art multi-layer optical coupler pad. For example, the single layer optical coupler pad exhibits no shrinkage with increases in operating temperature, while some prior art multi-layer optical coupler pads expand after removal from their manufacturing mold as a result of "cold flow" causing the pad to increase in surface area while decreasing in thickness. These changes in optical coupler pad dimensions reduce the likelihood of a tight fit between the CRT and lens assembly and make it less likely that the optical coupler pad will be precisely matched in size with the CRT's window. In summary, the single layer optical coupler pad 10 of the present invention provides a projected video image which is visually sharper, more acute, and brighter than the multi-layer prior art optical coupler pad approach.

Figure 5:
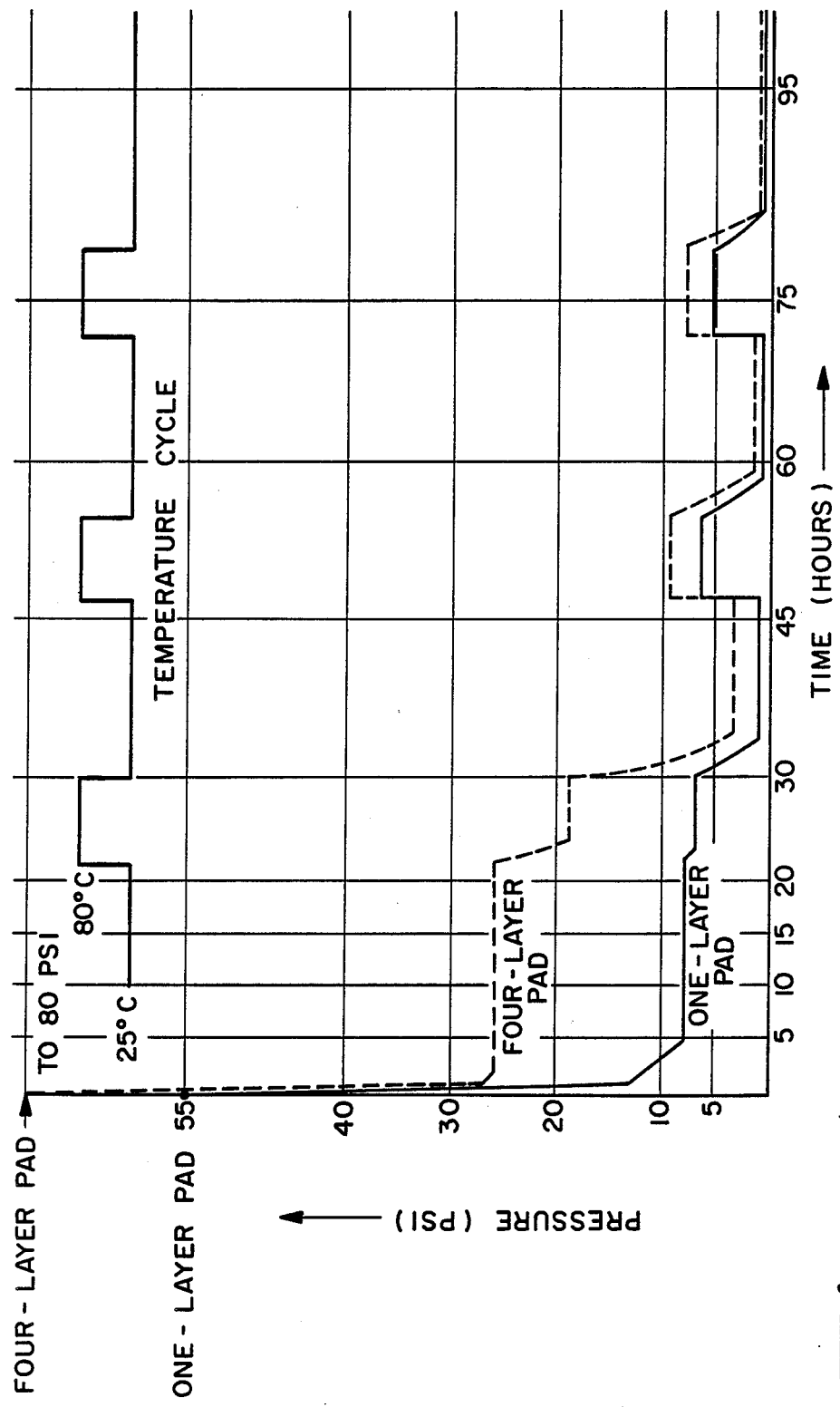
FIG. 5 illustrates the pressure build-up and decay under compression of an optical coupling pad in accordance with the present invention as compared with the compressibility characteristics of a prior art optical coupler pad.

Referring to FIG. 5, there is graphically shown a comparison between the compressibility of a prior art multi-layer optical coupler pad and the single layer coupler pad of the present invention. As shown in the figure, with the two optical coupler pads cycled over an extended period of time, i.e., in excess of 90 hours, over a temperature range of from 25° C. to 80° C. their compressibility characteristics vary. Each of the pads has a thickness of 0.141 inch ±0.003, with a gap set between the compression plates of the test apparatus set to 0.84 inch which is the nominal gap between the CRT and lens combination in this assembly. As shown in the figure, the temperature was increased for approximately 8 hours to approximately 80° C., followed by 17 hours at ambient temperature, with the cycle completed three times for each of the optical coupler pads. From the figure, it can be seen that the single layer optical coupler pad of the present invention induces 31% less pressure than the prior art multi-layer optical coupler pad having the same thickness, i.e., 55 psi vs. 80 psi, during relaxation prior to the first heat cycle. The enhanced compressibility of the single layer optical coupler pad of the present invention essentially eliminates CRT breakage during assembly of the CRT/lens combination. Following the initial application of pressure upon the two types of optical coupler pads, the remainder of the graph of FIG. 5 illustrates that while both types of optical coupler pads exhibit similar characteristics with variation in temperature, the single layer optical coupler pad of the present invention consistently exerts less pressure and thus affords higher compressibility than the multi-layer optical coupler pad of the prior art. Following temperature cycling of the two types of optical coupler pads, it was noted that the surfaces of the multi-layer optical coupler pad possess a substantially greater number of cracks across the entire pad than the single layer optical coupler pad of the present invention. Cracks in the surfaces of the optical coupler pad give rise to air bubbles which, as previously noted, degrade optical image quality due to refractive index variation in the optical path of the displayed image.

An advantage of the single layer optical coupler pad of the present invention over the multi-layer arrangement is that the resin ratio may be varied to achieve high or low tack, while the ratio of the two catalysts may be varied to achieve a hard or soft pad. The catalysts when used with their specified resin backbones produce pads of a certain physical nature, however, when two different catalysts are blended together and reacted with a combination of resin backbones, a type of synergistic cross-linking occurs, which may resemble a type of hybrid polymerization between the high molecular weight Sylgard 184 and the flexible low molecular weight 527.

There has thus been shown a single layer optical coupler pad for installation between the CRT and projection lens assembly of a projection television receiver. The single layer optical coupler pad is comprised of a pair of silicone resins and catalyst, whose combination is characterized by a compressibility in exccess of that of current optical coupler pads permitting greater compressive forces within the CRT/lens combination and eliminating air bubbles and other optical path anomalies without increasing the likelihood of CRT damage arising from increased compressive forces. The single layer optical coupler pad is inexpensively manufactured, easily installed during manufacture and easily removed for television receiver repairs, and offers a highly uniform refractive index which can be closely matched to those of the CRT faceplate and lens assembly.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a projection television receiver wherein a video image is projected and displayed, an arrangement comprising:
   a CRT having a window through which said video image is directed;
   lens means aligned with said CRT for receiving said video image directed through the window thereof for projecting said video image;
   compressible, adhesive, solid, optical coupling means having a unitary structure and a characteristic adhesiveness and compressibility and including first and second flat opposed surfaces disposed in tight-fitting engagement with said CRT window and said lens means, respectively, wherein said optical coupling means is comprised of at least first and second silicone resins and at least first and second catalysts, and wherein said characteristic adhesiveness may be changed by varying the ratio of said silicone resins and said characteristic compressiblity may be changed by varying the ratio of said catalysts; and
   mounting means for securely coupling said lens means to said CRT and for maintaining said optical coupling means in compression between said CRT window and said lens means.

2. The arrangement of claim 1 wherein said optical coupling means comprises a flexibly resilient, transparent pad having a uniform composition throughout.

3. The arrangement of claim 2 wherein said first and second resins are respectively Sylgard 184 resin and Sylgard 527-A resin and said first and second catalysts are respectively Sylgard 184 catalyst and Sylgard 527-B catalyst.

4. The arrangement of claim 3 wherein the ratio of said resins and the ratio of said catalysts may be varied over a preferred percentage range as follows:

Resins
Sylgard 184 resin: 20–40%
Sylgard 527-A resin: 60–80%

Catalysts
Sylgard 184 catalyst: 1–2%
Sylgard 527-B catalyst: 98–99%

5. The arrangement of claim 1 wherein said lens means includes a plurality of linearly aligned lenses aligned with the CRT's window and further including an end lens positioned in tight-fitting engagement with said optical coupling means.

* * * * *